United States Patent
Ye et al.

(10) Patent No.: US 10,268,758 B2
(45) Date of Patent: Apr. 23, 2019

(54) METHOD AND SYSTEM OF ACQUIRING SEMANTIC INFORMATION, KEYWORD EXPANSION AND KEYWORD SEARCH THEREOF

(71) Applicants: PEKING UNIVERSITY FOUNDER GROUP CO., LTD., Beijing (CN); FOUNDER APABI TECHNOLOGY LIMITED, Beijing (CN); PEKING UNIVERSITY, Beijing (CN)

(72) Inventors: Mao Ye, Beijing (CN); Zhi Tang, Beijing (CN); Jianbo Xu, Beijing (CN); Lifeng Jin, Beijing (CN); Wei Wan, Beijing (CN)

(73) Assignees: PEKING UNIVERSITY FOUNDER GROUP CO. LTD., Beijing (CN); FOUNDER APABI TECHNOLOGY LIMITED, Beijing (CN); PEKING UNIVERSITY, Beijing (CN)

( * ) Notice: Subject to any disclaimer, the term of this patent is extended or adjusted under 35 U.S.C. 154(b) by 310 days.

(21) Appl. No.: 15/025,460

(22) PCT Filed: Dec. 6, 2013

(86) PCT No.: PCT/CN2013/088782
§ 371 (c)(1),
(2) Date: Mar. 28, 2016

(87) PCT Pub. No.: WO2015/043077
PCT Pub. Date: Apr. 2, 2015

(65) Prior Publication Data
US 2016/0217142 A1   Jul. 28, 2016

(30) Foreign Application Priority Data
Sep. 29, 2013 (CN) .......................... 2013 1 0456256

(51) Int. Cl.
*G06F 17/30* (2006.01)
*G06F 3/0484* (2013.01)

(52) U.S. Cl.
CPC ........ *G06F 17/3071* (2013.01); *G06F 3/0484* (2013.01); *G06F 17/30666* (2013.01); *G06F 17/30672* (2013.01); *G06F 17/30684* (2013.01)

(58) Field of Classification Search
CPC ............... G06F 17/3071; G06F 3/0484; G06F 17/30666; G06F 17/30672; G06F 17/30684
See application file for complete search history.

(56) References Cited

U.S. PATENT DOCUMENTS

2002/0016798 A1   2/2002   Sakai et al.
2002/0091661 A1*  7/2002   Anick ............... G06F 17/30864
(Continued)

FOREIGN PATENT DOCUMENTS

CN   101944099 A   1/2011
CN   102402619 A   4/2012
(Continued)

OTHER PUBLICATIONS

Japanese Office Action for Japanese Patent Application No. 2016-518107, dated Jun. 6, 2017.
(Continued)

*Primary Examiner* — Jared M Bibbee
(74) *Attorney, Agent, or Firm* — Brinks Gilson & Lione (57) ABSTRACT

The present invention provides a semantic information acquisition method and system, and corresponding keyword expansion and search methods and systems, comprising: searching for, then classifying an article; then, performing word segmentation according to the classified article to obtain the words in said category, and setting said category
(Continued)

and words to serve as the semantic information of the keyword; also, a method and system using the semantic information acquisition method to expand a keyword, and a method and system using keyword expansion to perform a search. The described semantic information acquisition method effectively avoids the technical problems in the prior art of only being able to obtain semantic information of English vocabulary; and it also being impossible to classify semantic information based on category information. The invention is particularly suitable for searching using a keyword, searching a large number of texts, and organizing large amounts of related data and information.

15 Claims, 2 Drawing Sheets

(56) References Cited

U.S. PATENT DOCUMENTS

| | | | |
|---|---|---|---|
| 2002/0194162 A1* | 12/2002 | Rios | G06F 17/30864 |
| 2007/0143278 A1* | 6/2007 | Srivastava | G06Q 30/02 |
| 2007/0226202 A1* | 9/2007 | Cava | G06F 17/3064 |
| 2008/0010275 A1* | 1/2008 | Lee | G06F 17/30265 |
| 2008/0016040 A1* | 1/2008 | Jones | G06F 17/3064 |
| 2009/0313236 A1* | 12/2009 | Hernacki | G06F 17/30796 |
| 2011/0238491 A1* | 9/2011 | Bilenko | G06Q 30/02 705/14.43 |
| 2011/0307496 A1* | 12/2011 | Jones | G06F 17/30386 707/748 |
| 2012/0124089 A1* | 5/2012 | Sim | G06Q 30/02 707/776 |
| 2012/0203764 A1* | 8/2012 | Wood | G06F 17/30247 707/722 |
| 2013/0132364 A1* | 5/2013 | Udupa | G06F 17/30663 707/709 |
| 2013/0304818 A1* | 11/2013 | Brumleve | H04L 67/02 709/204 |
| 2014/0258002 A1* | 9/2014 | Zimmerman | G06Q 30/0256 705/14.72 |
| 2015/0006520 A1* | 1/2015 | Ormont | G06F 17/30864 707/723 |
| 2015/0019566 A1* | 1/2015 | Jones | G06F 17/3064 707/748 |

FOREIGN PATENT DOCUMENTS

| | | |
|---|---|---|
| CN | 102404619 A | 4/2012 |
| CN | 102819601 A | 12/2012 |
| EP | 1 679 617 A2 | 7/2006 |
| EP | 2 048 606 A2 | 4/2009 |
| EP | 2 159 715 A2 | 8/2009 |
| JP | 2006-190298 A | 7/2006 |
| JP | 2007310663 | 11/2007 |
| JP | 2009-099147 A | 5/2009 |
| JP | 2010-055618 A | 3/2010 |
| JP | 2010205224 | 9/2010 |
| JP | 2012138027 | 7/2012 |
| JP | 2013105210 | 5/2013 |
| WO | WO 2009/117830 A1 | 10/2009 |
| WO | WO2010061535 | 6/2010 |

OTHER PUBLICATIONS

Extended European Search Report EP 13894454.1, dated Mar. 31, 2017.
European Communication for EP 13 894 454.1-1222 dated Jul. 3, 2018 (8 pages).
Chinese Office Action for CN201310456256.9, dated Jun. 13, 2017.
Chinese Office Action for CN201310456256.9, dated Feb. 9, 2018.
Japanese Office Action for JP2016518107, dated Feb. 26, 2018 with translation.

* cited by examiner

METHOD AND SYSTEM OF ACQUIRING SEMANTIC INFORMATION, KEYWORD EXPANSION AND KEYWORD SEARCH THEREOF

CROSS-REFERENCE TO RELATED APPLICATIONS

This application is a national application of PCT/CN2013/088782, filed on Dec. 6, 2013, which application claims a right of priority to Chinese Patent Application No. 201310456256.9, filed Sep. 29, 2013, both of which are incorporated herein by reference in their entirety.

TECHNICAL FIELD

This invention relates a method and system of acquiring semantic information, a keyword expansion and a keyword search method and system thereof, particularly, to a method of acquiring semantic information of words based on text classification and word statistics, a keyword expansion method and a search method and system, which belongs to the field of electronic digital data processing.

DESCRIPTION OF THE RELATED ART

With the fast development of informationization construction, the number of various application systems is increasing gradually. Along with the operation of application systems, data and information resources have gained a rapid growth. As a result of lack of overall planning in early informationization construction, application systems are generally not sophisticatedly planned. Without standard data information definitions, it is hard to avoid the presence of various information islands. For example, current search engines when searching information are unable to obtain desired information directly and accurately based on inputted keywords. Especially, with polysemous words or homographic words inputted by users, it is unable to obtain search results that may satisfy users' demands. In our daily life and work, if it is desired to exchange information among application systems to search information, undesired information may be obtained. Such information is generally incomplete. On the other hand, it is also necessary to filter out a large amount of unrelated information from such information. This shows machines are unable to or it is difficult for machines to understand user's intentions in human-machine interaction. It is common to exchange information among various systems on the Internet, and the acquisition of semantic information through analyzing information of various systems has become an important issue in current or future researches.

WordNet created by psychologists, linguists and computer engineers of Princeton University is a lexical network of English language based on cognitive synonyms, which is commonly used to obtain semantic information of English words. A disadvantage of WordNet-based methods is those methods are only suitable for the acquisition of semantic information of English words. In the prior art, there is also a semantic information acquisition method for acquiring semantic information based on Chinese thesauruses. However, those thesauruses do not include words emerging recently, causing that it is unable to acquire semantic information of words accurately based on thesauruses. In addition, both of the methods described above cannot realize the classification of semantic information according to category information.

SUMMARY OF THE INVENTION

Thus, a technical problem to be solved in this invention is only semantic information of English words may be acquired in the prior art; further, it is unable to acquire semantic information of words accurately based on thesauruses for it is difficult to update thesauruses in time; in addition, it is unable to realize the classification of semantic information according to category information. Thereby, a semantic information acquisition method based on text classification and word statistics is provided.

To solve the above problem, this invention provides the following solutions.

A method of acquiring semantic information of a keyword, comprising: searching with a predetermined keyword to obtain articles related to the keyword; classifying the articles to determine related articles of each category; for at least one category, performing word segmentation on articles of this category and determining a plurality of words obtained as semantic information of the keyword in this category.

In the semantic information acquisition method, after determining a plurality of words obtained as semantic information of the keyword in this category, the method further comprises: removing stop words from the plurality of words, and determining words obtained after removing stop words as updated semantic information.

The method further comprises a process of obtaining co-occurrence words around the keyword and using the co-occurrence words as updated semantic information.

The method further comprises calculating relationship strength between the co-occurrence words and the keyword and using co-occurrence words having stronger relationship strength as updated semantic information.

In the process of obtaining co-occurrence words around the keyword, the method further comprises a process of counting occurrence numbers of the co-occurrence words.

The semantic information further comprises word occurrence number information, wherein the word occurrence number information represents the number of times a word appears in articles of a category.

The method further comprises using category information as semantic information of the keyword.

A keyword expansion method based on semantic information, comprising: according to a keyword inputted by a user, acquiring at least one category of the keyword; determining the acquired category and words included in this category as expanded keywords of the keyword.

According to the keyword expansion method, in the process of acquiring at least one category of the keyword according to a keyword inputted by a user, through comparing the keyword inputted by the user and keywords used in the semantic information acquisition method, obtaining at least one category corresponding to a matched keyword in the semantic information.

According to the keyword expansion method, in the process of acquiring at least one category of the keyword, all categories of the keyword are acquired.

According to the keyword expansion method, the process of determining the acquired category and words included in this category as expanded keywords of the keyword comprises using all words in all categories corresponding to the keyword as expanded keywords of the keyword.

A search method based on a keyword expansion method, wherein a keyword inputted by a user and expanded keywords determined for the keyword are used as search words to be searched simultaneously.

A search method based on a keyword expansion method, wherein according to a keyword inputted by a user, expanded keywords of the keyword are displayed to the user as recommended keywords for making a selection from complete semantic information by the user.

A search method based on a keyword expansion method, when displayed to the user, words in each category of the expanded keywords are sorted in descending order of their occurrence numbers.

According to the search method based on a keyword expansion method, the process of making a selection from complete semantic information by the user comprises: searching with a word selected by the user as a search word separately; or searching with a plurality of words selected by the user as search words to be searched simultaneously; or searching with a plurality of words selected by the user and the keyword inputted by the user as search words to be searched simultaneously; or searching with words included in a category selected by the user as search words to be searched simultaneously; or searching with words included in a plurality of categories selected by the user as search words to be searched simultaneously.

A keyword expansion method based on semantic information, comprising: according to a plurality of keywords inputted by a user, acquiring at least one category of each keyword; determining each category obtained and words included in each category as expanded keywords of the keywords.

According to the keyword expansion method based on semantic information, in the process of acquiring at least one category of each keyword, all categories are acquired for each keyword; in the case of repetitive categories, those repetitive categories are deduplicated and are prioritized to be displayed.

A keyword semantic information acquisition device, comprising: a search unit for searching with a predetermined keyword to obtain articles related to the keyword; a classification unit for classifying the articles to determine related articles of each category; an acquisition unit for, for at least one category, performing word segmentation on articles of this category and determining a plurality of words obtained as semantic information of the keyword in this category.

In the keyword semantic information acquisition device, the acquisition unit comprises: a stop word removing subunit for removing stop words from the plurality of words; an update subunit for determining words obtained after removing stop words as updated semantic information.

In the keyword semantic information acquisition device, the acquisition unit further comprises a co-occurrence word acquisition subunit for obtaining co-occurrence words around the keyword and using the co-occurrence words as updated semantic information.

In the keyword semantic information acquisition device, the acquisition unit further comprises a relationship strength calculation subunit for calculating relationship strength between the co-occurrence words and the keyword and using co-occurrence words having stronger relationship strength as updated semantic information.

In the keyword semantic information acquisition device, in the co-occurrence word acquisition subunit, the process of obtaining co-occurrence words around the keyword further comprises counting occurrence numbers of the co-occurrence words.

In the keyword semantic information acquisition device, the semantic information further comprises word occurrence number information, wherein the word occurrence number information represents the number of times a word appears in articles of a category.

The keyword semantic information acquisition device further comprises using category information as semantic information of the keyword.

A keyword expansion system based on semantic information, comprising: a category acquisition unit for according to a keyword inputted by a user, acquiring at least one category of the keyword; a keyword expansion unit for determining the acquired category and words included in this category as expanded keywords of the keyword.

According to the keyword expansion system based on semantic information, through comparing the keyword inputted by the user and keywords used in the semantic information acquisition method, the category acquisition unit obtains at least one category corresponding to a matched keyword in the semantic information.

According to the keyword expansion system based on semantic information, in the process of acquiring at least one category of the keyword, all categories of the keyword are acquired.

According to the keyword expansion system based on semantic information, in the keyword expansion unit uses all words in all categories corresponding to the keyword as expanded keywords of the keyword.

A search system based on a keyword expansion method, comprising: a search unit for using a keyword inputted by a user and expanded keywords determined for the keyword as search words to be searched simultaneously.

A search system based on a keyword expansion method, comprising: a recommendation unit for according to a keyword inputted by a user, displaying expanded keywords of the keyword to the user as recommended keywords to enable the user to make a selection from complete semantic information.

According to the search system based on a keyword expansion method, in the recommendation unit, when displayed to the user, words in each category of the expanded keywords are sorted in descending order of their occurrence numbers.

According to the search system based on a keyword expansion method, the following subunits are provided for enabling the user to make a selection from complete semantic information: a first subunit for searching with a word selected by the user as a search word separately; a second subunit for searching with a plurality of words selected by the user as search words to be searched simultaneously; a third subunit for searching with a plurality of words selected by the user and the keyword inputted by the user as search words to be searched simultaneously; a fourth subunit for searching with words included in a category selected by the user as search words to be searched simultaneously; a fifth subunit for searching with words included in a plurality of categories selected by the user as search words to be searched simultaneously.

A keyword expansion system based on semantic information, comprising:

a category acquisition unit for according to a plurality of keywords inputted by a user, acquiring at least one category of each keyword;

a keyword expansion unit for determining each category obtained and words included in each category as expanded keywords of the keywords.

According to the keyword expansion system based on semantic information, in the category acquisition unit, all categories are acquired for each keyword; in the case of repetitive categories, those repetitive categories are deduplicated and are prioritized to be displayed.

One or more computer readable mediums having stored thereon computer-executable instructions that when executed by a computer perform a keyword semantic information acquisition method, the method comprising: searching with a predetermined keyword to obtain articles related to the keyword; classifying the articles to determine related articles of each category; for at least one category, performing word segmentation on articles of this category and determining a plurality of words obtained as semantic information of the keyword in this category.

The above technical solutions of this disclosure have one or more of the following advantages over the prior art.

(1) the semantic information acquisition method of this disclosure comprises: searching with keywords and classifying articles obtained through search; performing word segmentation on articles of a category to obtain words of this category, and using a plurality of words of this category as semantic information of the keyword. The above semantic information acquisition method may effectively avoid the problem in the prior art, i.e., only semantic information of English words may be acquired; it is difficult to update thesauruses in time, causing that it is unable to acquire semantic information of words accurately based on thesauruses; in addition, it is unable to realize the classification of semantic information according to category information. This method is particularly suitable for searching with keywords, searching in a large amount of articles and integrated processing of a large amount of related data information.

(2) the semantic information acquisition method of this disclosure comprises: a process of removing stop words, obtaining co-occurrence words using a sliding window and calculating relationship strength between the co-occurrence words and the keyword. Through various filtering steps, insignificant words may be removed to remain relevant words, thereby improving the accuracy of words classified into the category of the keyword.

(3) the semantic information acquisition method of this disclosure further comprises: counting occurrence numbers of words to obtain occurrence frequencies. The popularity of information represented by a word in a category may be identified in a better manner according to its occurrence frequency.

(4) a keyword expansion method based on semantic information is further provided in this disclosure, comprising using the semantic information acquisition method described above, determining at least one category in the semantic information and words included in the category as expanded keywords. A keyword inputted by a user may be expanded in this manner, so that search coverage rate may be improved, which is helpful in obtaining complete search information and providing better search results to users.

(5) in the keyword expansion method of this disclosure, the keyword inputted by a user is compared with keywords used in the method of acquiring semantic information, and semantic information corresponding to a matched keyword is selected as an expansion of the keyword inputted by the user, enabling the single keyword to be expanded in its various meanings to cover information of various aspects.

(6) a search method based on keyword expansion is provided in this disclosure, in which search is performed after keyword expansion of a keyword inputted by a user, so that search coverage rate may be improved.

(7) a search method based on keyword expansion is provided in this disclosure, which may determine search words based on a user's selection to combine the selection with expanded keywords, and is helpful in finding out semantic information implicated in the search request of the user. Meanwhile, the search engine is enabled to match a large amount of text with semantic meanings mined deeply, so that the accuracy of responding to a specific user request may be improved and the time required by a user to check and make a selection from the search result may be reduced.

BRIEF DESCRIPTION OF THE DRAWINGS

For an easier and clear understanding of this invention, a further description of this invention will be given below with reference to the accompanying drawings, in which.

DETAILED DESCRIPTION OF THE PREFERRED EMBODIMENT

Embodiment 1

Figure 1:
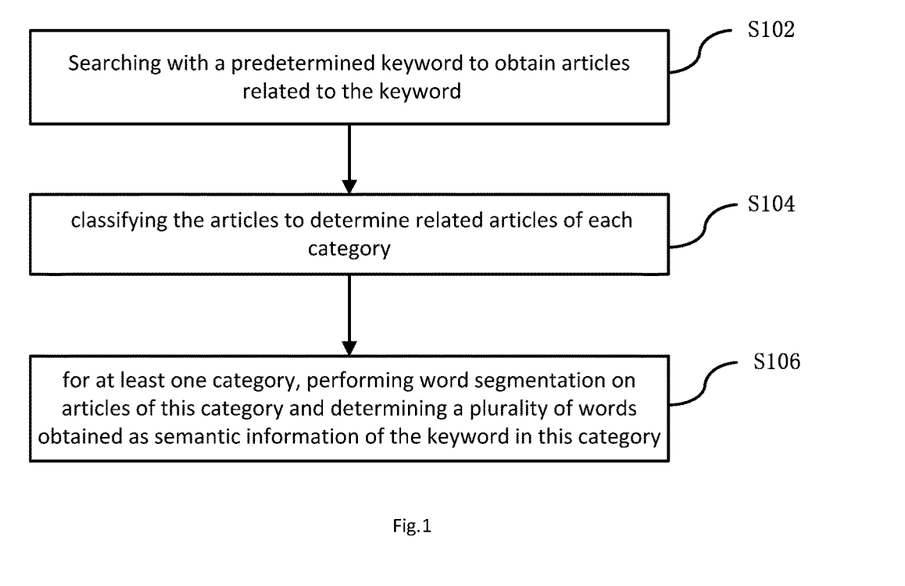
FIG. 1 is a flowchart of a method of acquiring semantic information of a word according to an embodiment of this invention.

FIG. 1 is a flowchart of a method of acquiring semantic information of a word according to an embodiment of this invention. This method provides a method of acquiring semantic information of a keyword, as shown in FIG. 1, the method comprises: S102 searching with a predetermined keyword to obtain articles related to the keyword; S104: classifying the articles to determine related articles of each category; S106: for at least one category, performing word segmentation on articles of this category, determining a sequence of words obtained as words in this category and using this category and its corresponding words as semantic information of the keyword. The semantic information acquisition method of the above embodiment comprises: searching and classifying articles; performing word segmentation on articles of a category to obtain words of this category, and using a plurality of words of this category as semantic information of the keyword. The above semantic information acquisition method may effectively avoid the problem in the prior art, i.e., only semantic information of English words may be acquired; it is difficult to update thesauruses in time, causing that it is unable to acquire semantic information of words accurately based on thesauruses; in addition, it is unable to realize the classification of semantic information according to category information. This method is particularly suitable for searching with keywords, searching in a large amount of articles and integrated processing of a large amount of related data information.

As another embodiment, words in each of various categories obtained are used as semantic information of the keyword, to achieve a better representation of words corresponding to various meanings of the keyword.

Embodiment 2

Figure 2:
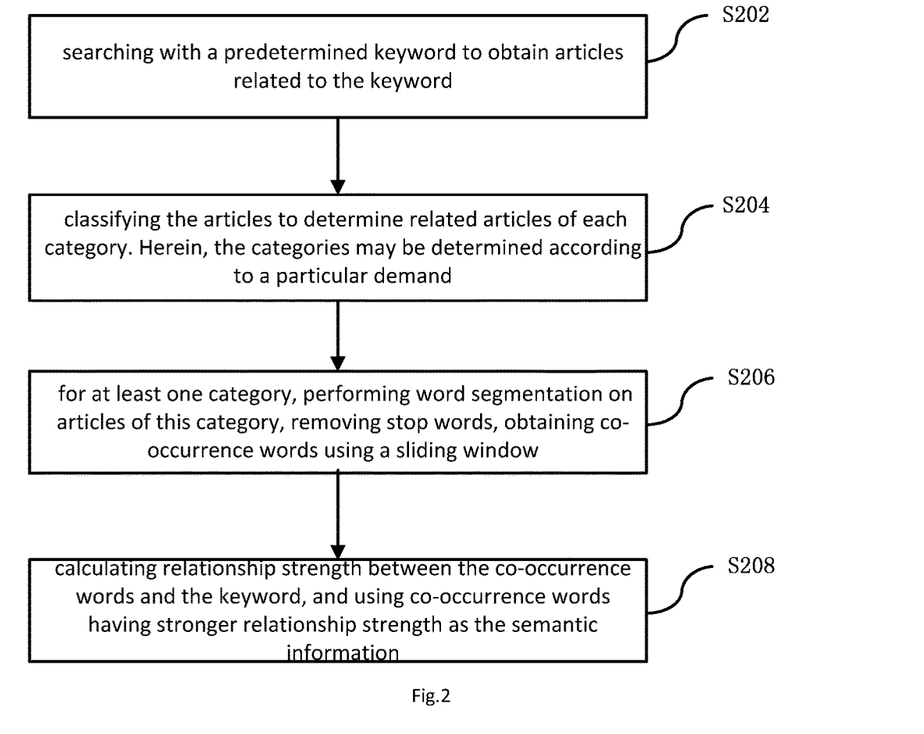
FIG. 2 is a flowchart of a method of acquiring semantic information of a word according to another embodiment of this invention.

FIG. 2 is a flowchart of a method of acquiring semantic information of a word according to another embodiment of this invention. As shown in FIG. 2, the method comprises:

S202: searching with a predetermined keyword to obtain articles related to the keyword;

S204: classifying the articles to determine related articles of each category. Herein, the categories may be determined according to a particular demand.

S206 to S208: for at least one category, performing word segmentation on articles of this category, removing stop words, obtaining co-occurrence words using a sliding window, calculating relationship strength between the co-occurrence words and the keyword, and using co-occurrence words having stronger relationship strength as the semantic information.

As an alternative embodiment, words obtained after word segmentation, removing stop words or obtaining co-occurrence words described above may be used as semantic information. However, words obtained after all of these processes are most relevant words of the keyword.

As a preferred embodiment, the method further comprises a process of counting the occurrence numbers of words that are determined as semantic information, such as counting the occurrence numbers of the co-occurrence words. The occurrence numbers of words that are determined as semantic information are also used as semantic information, the occurrence number being the number of times a word appears in all articles of a category. Meanwhile, classification information may be used as semantic information of the keyword as well, in which case a category having a maximum number of articles obtained through searching is considered as a preferred category. In this manner, the most complete semantic information is obtained, including not only various categories and words in these categories, but also occurrence numbers of these words in various categories, and words having top occurrence numbers are prioritized words.

Embodiment 3

This embodiment provides a keyword expansion method based on semantic information, comprising:

(1) according to a keyword inputted by a user, acquiring at least one category of the keyword. According to the keyword inputted by the user, categories of the keyword and semantic information corresponding to various categories are obtained using the semantic information acquisition method described herein. At least one category in the semantic information is acquired. Preferably, all categories of the keyword may be acquired, or some categories containing more articles among all of the categories may be acquired. Herein, a specific setting or selection may be made by users according to particular demands.

(2) determining the acquired category and words included in this category as expanded keywords of the keyword. Herein, the number of words selected from each category may be specified as needed, such as 10 or 50 words.

Embodiment 4

A search method based on the keyword expansion method described above, in which a keyword inputted by a user and determined expanded keywords of the keyword are used as search words to be searched simultaneously.

As an alternative embodiment, a search method based on the keyword expansion method, wherein according to a keyword inputted by a user, expanded keywords of the keyword are displayed to the user as recommended keywords, so that the user may make a selection from complete semantic information. When displayed to the user, those expanded keywords are sorted in descending order of their occurrence numbers. The process of making a selection from complete semantic information comprises:

searching with a word selected by the user as a search word separately;

or searching with a plurality of words selected by the user as search words to be searched simultaneously;

or searching with a plurality of words selected by the user and the keyword inputted by the user as search words to be searched simultaneously;

or searching with words included in a category selected by the user as search words to be searched simultaneously;

or searching with words included in a plurality of categories selected by the user as search words to be searched simultaneously.

Embodiment 5

This embodiment provides a method of expanding multiple keywords inputted by a user, i.e., a keyword expansion method based on semantic information, comprising:

(1) according to a plurality of keywords inputted by a user, acquiring at least one category of each keyword. The category of the keyword may be determined using the semantic information acquisition method described herein. As an alternative embodiment, all categories or some preferred categories of each keyword may be acquired. In the case of repetitive categories, those repetitive categories are deduplicated and are prioritized to be displayed.

(2) determining each category obtained and words included in the category as expanded keywords of this keyword. Herein, different categories are aggregated together to obtain words included in those categories. The number of words included in each category may be selected or set according to particular needs.

Embodiment 6

Figure 3:
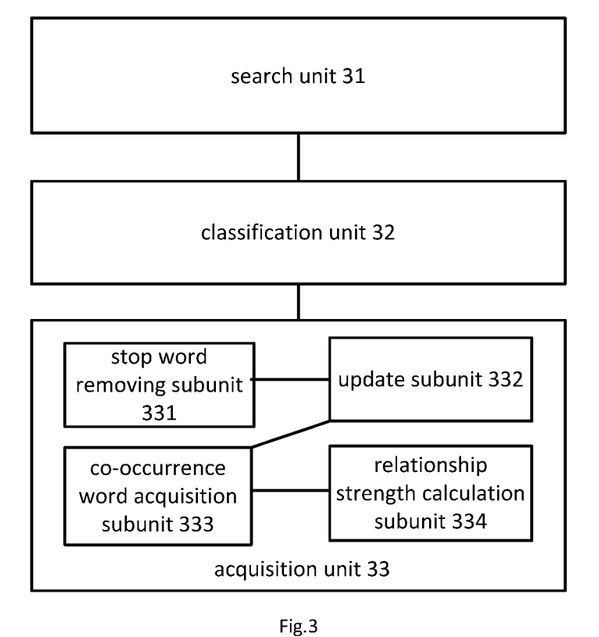
FIG. 3 is a structural diagram of a device of acquiring semantic information of a keyword according to an embodiment of this invention.

FIG. 3 is a structural diagram of a device of acquiring semantic information of a keyword according to an embodiment of this invention. As shown in FIG. 3, the device of acquiring semantic information of a keyword comprises: a search unit 31 for searching with a predetermined keyword to obtain articles related to the keyword; a classification unit 32 for classifying the articles to determine related articles of each category; an acquisition unit 33 for, for at least one category, performing word segmentation on articles of this category and determining a plurality of words obtained as semantic information of the keyword in this category.

As an alternative embodiment, the acquisition unit comprises: a stop word removing subunit 331 for removing stop words from the plurality of words; an update subunit 332 for determining words obtained after removing stop words as updated semantic information.

Further, the acquisition unit further comprises: a co-occurrence word acquisition subunit 333 for obtaining co-occurrence words around the keyword and using the co-occurrence words as updated semantic information. Further, the acquisition unit further comprises a relationship strength calculation subunit 334 for calculating relationship strength between the co-occurrence words and the keyword and using co-occurrence words having stronger relationship strength as updated semantic information.

As an alternative embodiment, in the co-occurrence word acquisition subunit, the process of obtaining co-occurrence words around the keyword further comprises counting occurrence numbers of the co-occurrence words. The semantic information further comprises word occurrence number information, wherein the word occurrence number information represents the number of times a word appears in articles of a category. Category information is also used as semantic information of the keyword.

Embodiment 7

Figure 4:
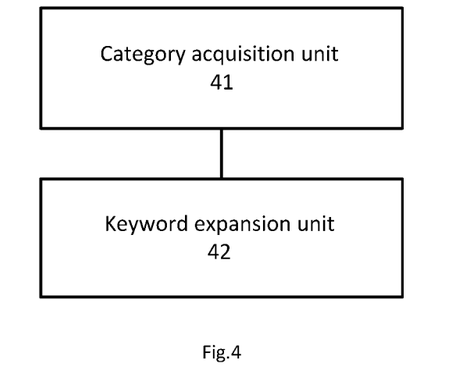
FIG. 4 is a structural diagram of a keyword expansion system based on semantic information according to an embodiment of this invention.

FIG. 4 is a structural diagram of a keyword expansion system based on semantic information according to an embodiment of this invention. As shown in FIG. 4, the system comprises: a category acquisition unit 41 for according to a keyword inputted by a user, acquiring at least one category of the keyword; in the category acquisition unit, through comparing the keyword inputted by the user and keywords used in the semantic information acquisition method, the category acquisition unit obtains at least one category corresponding to a matched keyword in the semantic information. As an alternative embodiment, all or some categories of the keyword may be acquired. A keyword expansion unit 42 for determining the acquired category and words included in this category as expanded keywords of the keyword.

As an alternative embodiment, in the case of multiple keywords inputted by a user, a keyword expansion system based on semantic information is provided, comprising:

a category acquisition unit for according to multiple keywords inputted by a user, acquiring at least one category of each keyword. As an alternative embodiment, all or some categories of each keyword may be acquired. In the case of repetitive categories, those repetitive categories are deduplicated and are prioritized to be displayed.

a keyword expansion unit for determining the each of the acquired categories and words included in this category as expanded keywords of the keyword.

Embodiment 8

A search system based on a keyword expansion method, comprising a search unit for using a keyword inputted by a user and expanded keywords determined for the keyword as search words to be searched simultaneously.

In another embodiment, a search system based on a keyword expansion method, comprising: a recommendation unit for according to a keyword inputted by a user, displaying expanded keywords of the keyword to the user as recommended keywords to enable the user to make a selection from complete semantic information. In the recommendation unit, when displayed to the user, words in each category of the expanded keywords are sorted in descending order of their occurrence numbers. The following subunits are provided for enabling the user to make a selection from complete semantic information:

a first subunit for searching with a word selected by the user as a search word separately;

a second subunit for searching with a plurality of words selected by the user as search words to be searched simultaneously;

a third subunit for searching with a plurality of words selected by the user and the keyword inputted by the user as search words to be searched simultaneously;

a fourth subunit for searching with words included in a category selected by the user as search words to be searched simultaneously;

a fifth subunit for searching with words included in a plurality of categories selected by the user as search words to be searched simultaneously.

Embodiment 9 (Method of Acquiring Semantic Information of a Keyword)

Given a predetermined keyword "apple", 200 articles related to "apple" are acquired through searching, which are then classified to different categories. The number of categories may be specified according to particular needs. For a project having many categories, some categories are prioritized to acquire words contained therein. A category including a few articles may be directly removed without acquiring articles included therein. In this embodiment, categories are Food—80 articles, Electronics—100 articles, Entertainment Product—20 articles.

Word segmentation is performed on 100 articles in the category of Electronics. A sequence of words is acquired. At this point, the semantic information of "apple" is: a sequence of words in the category of Electronics.

In order to improve relevance between the sequence of words obtained in embodiment 1 and keyword "apple", after word segmentation performed on 100 articles in the category of Electronics, stop words are removed to remove meaningless stop words. Then co-occurrence words around a target word are obtained using a sliding window, and relationship strengths between the co-occurrence words and the keyword are calculated. Those co-occurrence words having stronger relationship strength are determined as the selected words. Herein, the number of the selected words may be specified according to practical needs, in general, about 30 to 50 words. Words obtained after the above calculation is: "Apple mobile phone", "Apple computer", and "ipad".

In order to guarantee more complete information of this keyword "apple", it is necessary to perform a similar process on articles in all of other categories, i.e., Food—80 articles and Entertainment Product—20 articles to acquire words in various categories. After the processing of all categories, the following semantic information is obtained:

Apple Food: apple, apple-pear, Fuji apple

Electronics: Apple mobile phone, Apple computer, iPad

Entertainment Product: Apple mobile phone, iPod, Apple store

In addition, in order to provide using degrees of various words, the number of times each word appears in all articles of a corresponding category is counted as part of the semantic information. For example:

Apple Food: apple (500), apple-pear (320), Fuji apple (200)

Electronics: Apple mobile phone (400), Apple computer (200), iPad (150)

Entertainment Product: Apple mobile phone (200), iPod (100), Apple store (50)

Embodiment 10 (Keyword Expansion Method Based on Semantic Information)

According to the semantic information acquisition method of embodiment 1, after semantic information acquisition, when a user enters keyword "apple", at least one category in the semantic information of "apple" is obtained. Herein, in order to guarantee a high coverage rate, all categories are obtained. All categories and words included in these categories are used as expanded keywords. That is, expanded keywords of "apple" are:

Apple Food: apple, apple-pear, Fuji apple

Electronics: Apple mobile phone, Apple computer, iPad

Entertainment Product: Apple mobile phone, iPod, Apple store

When a user enters "apple" as a search word, all of above categories and words are used as search words to be searched, so that an improved search coverage degree is achieved for the keyword inputted by the user, which is helpful in obtaining search information including results required by the user.

Embodiment 11

In addition to the semantic information of "apple" above, semantic information of "Lenovo" is also established. When a user enters "apple" and "Lenovo" at the same time, these two words are expanded respectively. First, all semantic information of each keyword is obtained respectively, and then is deduplicated and aggregated as expanded keywords.

After these expansions have been displayed to the user, the user may make a selection from these expanded words. Then, a search is performed using search words automatically generated according to the selection of the user, for example, searching with a word selected by the user as a search word; or searching with multiple words selected by the user as search words; or searching with multiple words selected by the user and the keyword inputted by the user as search words; or searching with words included in a category selected by the user as search words; or searching with words included in multiple categories selected by the user as search words.

Embodiment 12

This embodiment provides a method of acquiring semantic information of a keyword. Words may be exhibited as symbols according to arbitrary conventions. Users use these symbols to indicate concepts, i.e., semantic information given to the words. For the purpose of thorough understanding of a query, the acquisition of semantic information of each word becomes a very important precondition. With a method of text classification and word statistics, semantic expansion may be performed to achieve the effect of acquiring semantic information.

The semantic information acquisition method of this embodiment comprises the following steps.

Step 1: given a training corpus and a target word, herein the target word is a keyword, the semantic information of which will be acquired, acquiring articles including the target word through full text searching. These articles may be considered as a broader semantic range of this word. However, these articles have scrambled data and information contained therein, which may obscure valid information intensively. Thereby, it is necessary to perform further processes on these articles.

Step 2: classifying the selected articles using a text classifier. Due to the significant dependence of words on their usage environment, and in terms of different meanings of a word, the dependence on its context, selected articles may be classified into a specified classification system according to different contextual characteristics. Each article is labeled with a field or a category it belongs to.

Step 3: sorting by descending order of the numbers of articles included in various categories.

Step 4: after sorting, taking the first m categories to exclude trivial matters from the training corpus while remaining categories having significant context information, and prevent errors caused by the classifier. As to the value of m, the ratio of the number of articles associated with the given word to the number of all articles included in the m categories selected shall be greater than a specified threshold α, in order to guarantee that semantic information may be remained as much as possible according to the particular requirement of an application while excluding the trivial matters. Empirically, the value of α is in a range from 80% to 90%.

Step 5: after acquiring articles belonging to the first m categories and carrying context information of the target word, performing word segmentation on these articles and removing stop words to remove information having no semantic information from the text; using a sliding window having a size of k, extracting all words included in the window around the position where the target word appears, and calculating relationship strength between the target word and these co-occurrence words using an algorithm for word-relationship statistics to obtain values of relationship strength between the target word and co-occurrence words semantically related to the target word. The size K of the sliding window controls the semantic radiation range of the word. Empirically, the value of K is 6.

Step 6: sorting the set of co-occurrence words of the target word by descending order of their relationship strength values and according to article categories they belong to. That is, the first n co-occurrence words having relationship strength values arranged from high to low with the target word are obtained for each of the m categories. A set of word in each category is the semantic information of the target word in this category, identifying a unique and recognizable category of the target word. The sum of all semantic information is the comprehensive semantic information of the target word. Because the object of the application is to obtain categories for parsing words contained in a sentence to be searched by a user, category information in the semantic information is important.

Step 7: executing operations of step 1 to step 7 for each target word concerned to obtain a category each target word fits into and words belonging to this category as semantic information of the target word, so that a semantic information repository is established.

Embodiment 13

On the basis of embodiment 12, keyword expansion is performed to recommend search words for searching.

With the semantic information obtained in embodiment 12, based on a search word inputted by a user, a plurality of semantic information options are provided for the user to obtain more accurate meanings from the user and in turn a more accurate search result, particularly as follows.

Step 1: the keyword inputted by the user is fed back to the semantic information repository to obtain semantic information of the keyword, that is, to obtain semantic information of all categories of this word through calculation in stage one.

Step 2: because the semantic information of the target word inputted by the user comprises m categories or category terms, each category including n co-occurrence words, a semantic prompt is provided to the user in the form of words in m rows and n' columns (n' is less than or equal to n) as recommended search words. The user is asked to make a selection to semantically clarify the search condition.

Step 3: after the user has selected one of the m rows or a word in this row, co-occurrence words in this category or words selected by the user are automatically added into search words of the user as expanded keywords for searching.

Embodiment 14

With word "apple" as an example, how to obtain semantic information of a word and provide it to a user through search word recommendation will be illustrated below.

Stage 1: obtain semantic information of the word.

Step 1: using a corpus well chosen from an internal journal database as a selected corpus resource, search word "apple" in the whole corpus through full text searching to obtain about 7000 articles in which word "apple" appears as basic data of subsequent semantic analysis.

Step 2: classify the 70000 articles in a predetermined category system using a SVM classifier to label each article with a category tag.

Step 3: count the number of articles classified in each category to obtain statistic result.

Step 4: it can be found through checking the classification result that most articles including word "apple" are classified into category "Science" and category "Food", and only a relatively fewer number of articles are contained in other categories. Thereby, the value of m is set to 2 for word "apple", i.e., the first two categories comprise above 80% of the relevant articles.

Step 5: perform word segmentation on all articles included in these two categories selected and remove stop words; with a sliding window in a size of 6 and a word-relationship strength calculation algorithm for counting absolute occurrence frequencies of words, make a process on all words segmented from these articles to obtain two categories: category "Science" and a vector of relevant co-occurrence words and their relationship strength values; category "Food" and a vector of relevant co-occurrence words and their relationship strength values.

Step 6: sort the two vectors generated in the above step in descending order, and only take the first 20 words as actual semantic information of each category. semantic information of word "apple" consists of two categories, 20 words in each category and their absolute frequencies.

Stage 2: recommend search words

Step 1: when a user enters "apple" as a search word, the system searches in an existed semantic information repository to obtain various semantic representations of "apple".

Step 2: word "apple" has two categories, the system cannot determine which category is desired by the user and forms two prompt lines from two categories "Science" and "Food" returned from the semantic information repository, on each line 5 words of total 20 words being provided as assistant selection information to enable the user to select a desired category accordingly.

Step 3: if the user selects a category, the system submits total 20 co-occurrence words and their strength values to a search engine as recommended expansion of the search word provided by the user; if the user selects a word in a category, the system submits this word to the search engine as recommended expansion of the search word.

As an alternative embodiment, in addition to forming recommended search words based on semantic information, this method may also show a multi-dimensional search word interface to users in other manners.

Step 1: the keyword inputted by the user is fed back to the semantic information repository to obtain semantic information of the keyword, that is, to obtain semantic information of all categories of this word through calculation in stage one, wherein the semantic information includes relationship strength values.

Step 2: because the semantic information of the target word inputted by the user comprises m categories or category terms, each category including n co-occurrence words, a semantic prompt is provided to the user in the form of words in m rows and n' columns (n' is less than or equal to n) as recommended search words. The user is asked to make a selection to semantically clarify the search condition. A prompt box is provided in the form of a drop-down box including m rows, each row comprising n' words belonging to the same category.

Step 3: after the user has selected one of the m rows or one or more words in a row, co-occurrence words in this category or words selected by the user are automatically added into search words of the user as expanded keywords for searching.

Embodiment 15

This embodiment provides a specific example of the keyword expansion method.

Step 1: when a user enters "apple" as a search word, the system searches in an existed semantic information repository to obtain various semantic representations of "apple".

Step 2: word "apple" has two categories, the system cannot determine which category is desired by the user and forms two prompt lines from two categories "Science" and "Food" returned from the semantic information repository, on each line 5 words of total 20 words being provided as assistant selection information to enable the user to select a desired category accordingly. All words on each row belong to the same category.

Step 3: if the user selects a category, the system submits total 20 co-occurrence words and their strength values to a search engine as recommended expansion of the search word provided by the user; if the user selects one or more words in a category, the system submits these words to the search engine as recommended expansion of the search word.

Obviously, the above embodiments are merely examples given for clear description, but not limitations of this invention. For those skilled in the art, other modifications or variations may be made based on the above description, which will not be and cannot be listed exhaustively herein. These apparent modifications or variations derived are still within the protection scope of this invention.

This invention further provides one or more computer readable mediums having stored thereon computer-executable instructions that when executed by a computer perform a keyword expansion method, the method comprising: searching with a predetermined initial keyword to obtain current keywords; using the current keywords obtained through searching as a basis of a next search, performing loop search through keyword iteration; if a keyword error between keywords obtained in the current search and those keywords obtained in a previous search is less than a predetermined threshold, terminating the loop search process and using the keywords obtained in the current search as expanded keywords.

This invention further provides one or more computer readable mediums having stored thereon computer-executable instructions that when executed by a computer perform a method of annotating a classified corpus described above.

Those skilled in the art should understand that the embodiments of this application can be provided as method, system or products of computer programs. Therefore, this application can use the forms of entirely hardware embodiment, entirely software embodiment, or embodiment combining software and hardware. Moreover, this application can use the form of the product of computer programs to be carried out on one or multiple storage media (including but not limit to disk memory, CD-ROM, optical memory etc.) comprising programming codes that can be executed by computers.

This application is described with reference to the method, equipment (system) and the flow charts and/or block diagrams of computer program products according to the embodiments of the present invention. It should be understood that each flow and/or block in the flowchart and/or block diagrams as well as the combination of the flow and/or block in the flowchart and/or block diagram can be achieved through computer program commands Such computer program commands can be provided to general computers, special-purpose computers, embedded processors or any other processors of programmable data processing equipment so as to generate a machine, so that a device for realizing one or multiple flows in the flow diagram and/or the functions specified in one block or multiple blocks of the block diagram is generated by the commands to be executed by computers or any other processors of the programmable data processing equipment.

Such computer program commands can also be stored in readable memory of computers which can lead computers or other programmable data processing equipment to working in a specific style so that the commands stored in the readable memory of computers generate the product of command device; such command device can achieve one or multiple flows in the flowchart and/or the functions specified in one or multiple blocks of the block diagram.

Such computer program commands can also be loaded on computers or other programmable data processing equipment so as to carry out a series of operation steps on computers or other programmable equipment to generate the process to be achieved by computers, so that the commands to be executed by computers or other programmable equipment achieve the one or multiple flows in the flowchart and/or the functions specified in one block or multiple blocks of the block diagram.

Although preferred embodiments of this application are already described, once those skilled in the art understand basic creative concept, they can make additional modification and alteration for these embodiments. Therefore, the appended claims are intended to be interpreted as encompassing preferred embodiments and all the modifications and alterations within the scope of this application.

What is claimed is:

1. A search method based on keyword expansion in a computer system, characterized in comprising:
    searching with a predetermined keyword to obtain articles related to the keyword;
    classifying the articles with a text classifier to determine related articles of each category;
    for at least one category, performing word segmentation on articles of this category;
    obtaining co-occurrence words around the keyword;
    calculating relationship strength between the co-occurrence words and the keyword;
    acquiring at least one category of each keyword based on the calculated relationship strength values of the co-occurrence words; and
    determining the acquired category and words included in each acquired category as expanded keywords of the keyword.

2. The method according to claim 1, characterized in that: in the process of obtaining co-occurrence words around the keyword, the method further comprises a process of counting occurrence numbers of the co-occurrence words.

3. The method according to claim 1, characterized in that: acquiring at least one category of each keyword according to a keyword inputted by a user comprises:
    through comparing the keyword inputted by the user and predetermined keywords, obtaining at least one corresponding category in semantic information of a predetermined keyword.

4. The method according to claim 1, characterized in that: in the process of acquiring at least one category of each keyword, all categories of the keyword are acquired;
    the process of determining the acquired category and words included in each acquired category as expanded keywords of the keyword comprises:
    using all words in all categories corresponding to the keyword as expanded keywords of the keyword.

5. The method according to claim 1, characterized in that, according to a keyword inputted by a user, expanded keywords of the keyword are displayed to the user as recommended keywords for making a selection by the user from the displayed keywords.

6. The method according to claim 5, characterized in that making a selection from complete semantic information by the user comprises:
    searching with a word selected by the user as a search word separately; or
    searching with a plurality of words selected by the user as search words to be searched simultaneously; or
    searching with a plurality of words selected by the user and the keyword inputted by the user as search words to be searched simultaneously; or
    searching with words included in a category selected by the user as search words to be searched simultaneously; or
    searching with words included in a plurality of categories selected by the user as search words to be searched simultaneously.

7. A keyword expansion search device in a computer system, characterized in comprising:
    a search unit including a search engine for searching with a predetermined keyword to obtain articles related to the keyword;
    a classification unit including a text classifier for classifying the articles to determine related articles of each category;
    an acquisition unit for, for at least one category, performing word segmentation on articles of this category;
    a co-occurrence acquisition subunit as a sub-unit of the acquisition unit for obtaining co-occurrence words around the keyword;
    a relationship strength calculation subunit as a sub-unit of the acquisition unit for calculating relationship strength between the co-occurrence words and the keyword;
    a category acquisition unit for acquiring at least one category of each keyword based on the calculated relationship strength values of the co-occurrence words; and
    a keyword expansion unit for determining the acquired category and words included in each acquired category as expanded keywords of the keyword.

8. The keyword expansion search device according to claim 7, characterized in that: in the co-occurrence word acquisition subunit, the process of obtaining co-occurrence words around the keyword further comprises counting occurrence numbers of the co-occurrence words.

9. The keyword expansion search device according to claim 7, characterized in that, through comparing a keyword inputted by a user and predetermined keywords, the category acquisition unit obtains at least one corresponding category contained in semantic information of a keyword.

10. The keyword expansion search device according to claim 9, characterized in that, in the process of acquiring at least one category of the keyword, all categories of the keyword are acquired.

11. The keyword expansion search device according to claim 10, characterized in that, in the keyword expansion unit uses all words in all categories corresponding to the keyword as expanded keywords of the keyword.

12. The keyword expansion search device according to claim 7, characterized in further comprising:
    a search unit for using a keyword inputted by a user and expanded keywords determined for the keyword as search words to be searched simultaneously.

13. The keyword expansion search device according to claim 7, characterized in further comprising: a recommendation unit for according to a keyword inputted by a user, displaying expanded keywords of the keyword to the user as recommended keywords to enable the user to make a selection from the displayed keywords.

14. The keyword expansion search device according to claim 13, characterized in that, in the recommendation unit, when displayed to the user, words in each category of the expanded keywords are sorted in descending order of their occurrence numbers.

15. The keyword expansion search device according to claim 14, characterized in that, the following subunits are provided for enabling the user to make a selection from complete semantic information:
- a first subunit for searching with a word selected by the user as a search word separately;
- a second subunit for searching with a plurality of words selected by the user as search words to be searched simultaneously;
- a third subunit for searching with a plurality of words selected by the user and the keyword inputted by the user as search words to be searched simultaneously;
- a fourth subunit for searching with words included in a category selected by the user as search words to be searched simultaneously;
- a fifth subunit for searching with words included in a plurality of categories selected by the user as search words to be searched simultaneously.

* * * * *